(12) United States Patent
Takayasu et al.

(10) Patent No.: US 8,210,607 B2
(45) Date of Patent: Jul. 3, 2012

(54) VEHICLE SEAT

(75) Inventors: Wataru Takayasu, Tochigi-ken (JP);
Masaki Nagayama, Tochigi-ken (JP)

(73) Assignee: TS Tech Co., Ltd, Asaka-Shi (JP)

( * ) Notice: Subject to any disclaimer, the term of this patent is extended or adjusted under 35 U.S.C. 154(b) by 402 days.

(21) Appl. No.: 12/303,100

(22) PCT Filed: Dec. 20, 2006

(86) PCT No.: PCT/JP2006/325439
§ 371 (c)(1),
(2), (4) Date: Oct. 2, 2009

(87) PCT Pub. No.: WO2007/138730
PCT Pub. Date: Dec. 6, 2007

(65) Prior Publication Data
US 2010/0295348 A1    Nov. 25, 2010

(30) Foreign Application Priority Data

May 29, 2006   (JP) .................................. 2006-149057

(51) Int. Cl.
*B60N 2/42* (2006.01)
(52) U.S. Cl. ................................................. 297/216.12
(58) Field of Classification Search ............. 297/216.12, 297/284.4, 408, 410
See application file for complete search history.

(56) References Cited

U.S. PATENT DOCUMENTS

| | | | |
|---|---|---|---|
| 5,547,259 A | 8/1996 | Fredrick | |
| 6,139,102 A * | 10/2000 | von Moller | 297/284.4 |
| 6,250,714 B1 * | 6/2001 | Nakano et al. | 297/216.12 |
| 6,260,921 B1 * | 7/2001 | Chu et al. | 297/284.4 |
| 6,568,753 B1 * | 5/2003 | Watanabe | 297/216.12 |
| 6,955,397 B1 * | 10/2005 | Humer | 297/216.12 |
| 7,077,472 B2 * | 7/2006 | Steffens, Jr. | 297/216.13 |
| 7,393,052 B2 * | 7/2008 | Humer et al. | 297/216.12 |
| 7,963,599 B2 * | 6/2011 | Omori et al. | 297/216.12 |
| 2008/0129092 A1 | 6/2008 | Omori | |
| 2009/0001785 A1 * | 1/2009 | Swan et al. | 297/216.12 |

FOREIGN PATENT DOCUMENTS

| | | |
|---|---|---|
| JP | 7298947 A | 11/1995 |
| JP | 10138811 A | 5/1998 |
| JP | 10181402 A | 7/1998 |
| JP | 2006122297 A | 5/2006 |
| WO | 2006046719 A1 | 5/2006 |

* cited by examiner

*Primary Examiner* — Peter R. Brown
(74) *Attorney, Agent, or Firm* — Browdy and Neimark, PLLC (57) ABSTRACT

A headrest is attached to a square frame-shaped seatback frame so that the headrest can be moved back and forth by an upper lever. The upper lever is connected by a connection rod to a lower lever provided at the seatback frame. Left and right connection arms of a rear collision detector are attached to the lower lever. Backward movement of the rear collision detector moves forward the headrest via the connection rod and the upper lever. The connection arms of the rear collision detector are fixed to the lower lever, held at a predetermined angle.

6 Claims, 12 Drawing Sheets

VEHICLE SEAT

TECHNICAL FIELD

The present invention relates to a vehicle seat having a mechanism for moving a headrest forward to protect the head of a seat occupant when the occupant moves backward on the vehicle seat in the event of collision from backward (rear collision).

BACKGROUND ART

In a vehicle seat known hitherto, a seatback frame is provided with a headrest movably back and forth by means of movable means, the movable means is provided with a rear collision detector, and when the seat occupant moves backward due to rear collision, the rear collision detector moves the headrest forward by way of the movable means.
Patent document 1: JP 2006-117129 A1

DISCLOSURE OF THE INVENTION

In the prior art, since the rear collision detector is attached to a lever of movable means by way of a shaft, when the rear collision detector moves backward, the center of rotation of the rear collision detector forms double centers, and the moving energy by the rear collision detector cannot be transmitted to the headrest efficiently.

The low transmission efficiency means there is an energy loss, and thus undesired noise may be caused.

It is hence an object of the invention to provide a vehicle seat capable of transmitting the backward movement energy of the rear collision detector efficiently to the headrest.

BEST MODE FOR CARRYING OUT THE INVENTION

An embodiment of the invention will be described with reference to the drawings. A vehicle seat 1 of the invention includes a seat bottom 9, a seatback 2 pivoted on the seat bottom 9, and a headrest 6. The seatback 2 has a seatback frame 3, and a cushion member 4 of urethane or the like attached to the seatback frame 3, and the cushion member 4 is surrounded with a cover 5. The seatback frame 3 has substantially a square-frame shape having a pair of side frames 17, an upper frame 14 coupling the upper parts of the side frames 17, and a lower frame 18 coupling the lower parts of the side frames 17.

The headrest 6 has a pair of pillars 8, which are vertically adjustably supported on pillar holders 11 fixed on a movable member 10 extended laterally. The movable member 10 is positioned at the front side of the upper frame 14. At both sides of the upper frame 14, brackets 24, 24 are fixed, and each bracket 24 has an upper lever 15 pivoted on a shaft 16. The right and left sides of the movable member 10 are fixed to an upper arm 22 of the upper lever 15, and when the upper lever 15 rotates counterclockwise as shown in FIG. 3, the movable member 10 substantially moves forward, and the headrest 6 is moved forward.

A lower arm 23 of the upper lever 15 is extended downward to the front side, and is coupled to the upper part of a connection rod 20 by a pin 21. The lower arm 23 is shorter than the upper arm 22, and when the connection rod 20 moves downward, the movable member 10 moves largely forward by the downward movement of the connection rod 20. The upper lever 15 is biased by the upper spring 12 in the clockwise direction in FIG. 3.

A rear collision detector 25 is provided in the inside surrounded by the square-frame shaped seatback frame 3. The rear collision detector 25 detects a backward movement of the seat occupant in the event of rear collision. The rear collision detector 25 has a central plate 25A and connection arms 33 provided at both sides of the central plate 25A. The leading ends of the connection arms 33 are coupled to the lower lever 26 pivoted on the lever shaft 28 on each side frame 17 by connection shafts 27. The lower part of the connection rod 20 is coupled to the lower lever 26 by means of a pin 29. The lower lever 26 is biased by the lower spring 13 in the clockwise direction in FIG. 3.

Figure 1:
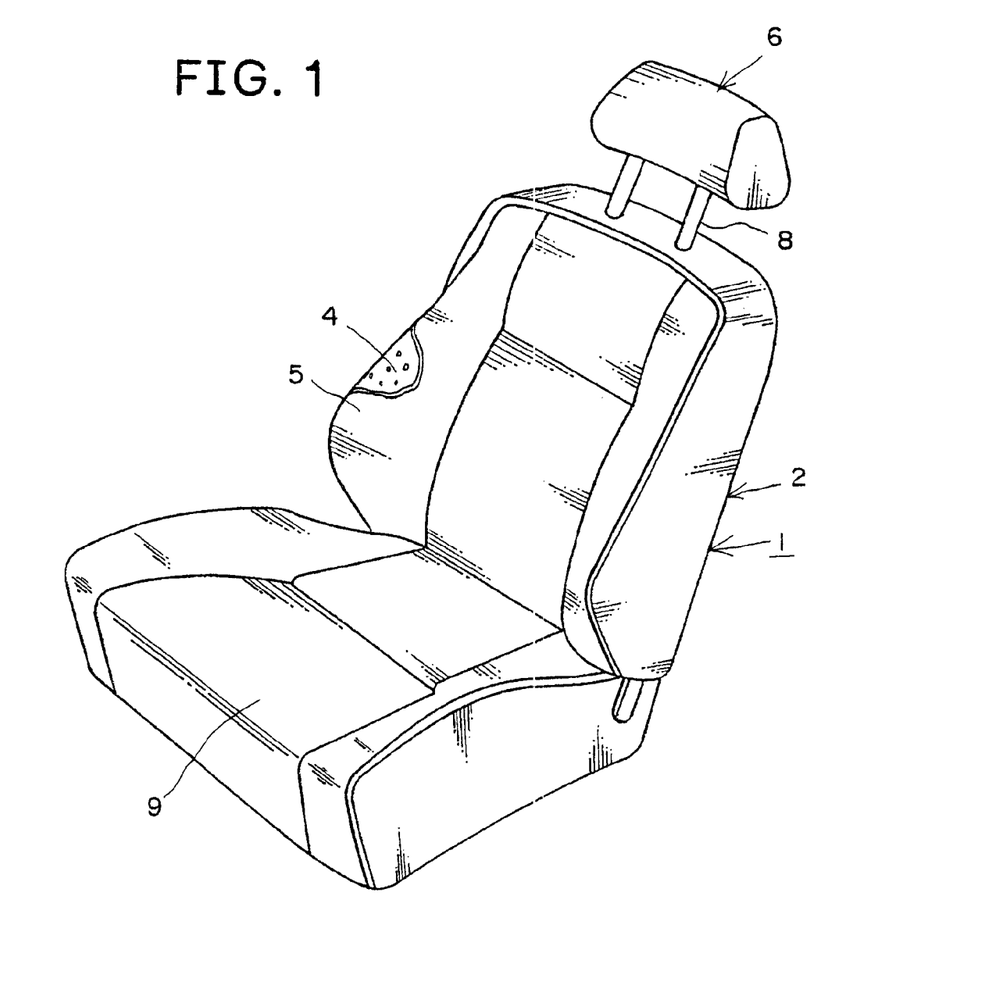
FIG. 1 is a perspective view of a vehicle seat.
Figure 2:
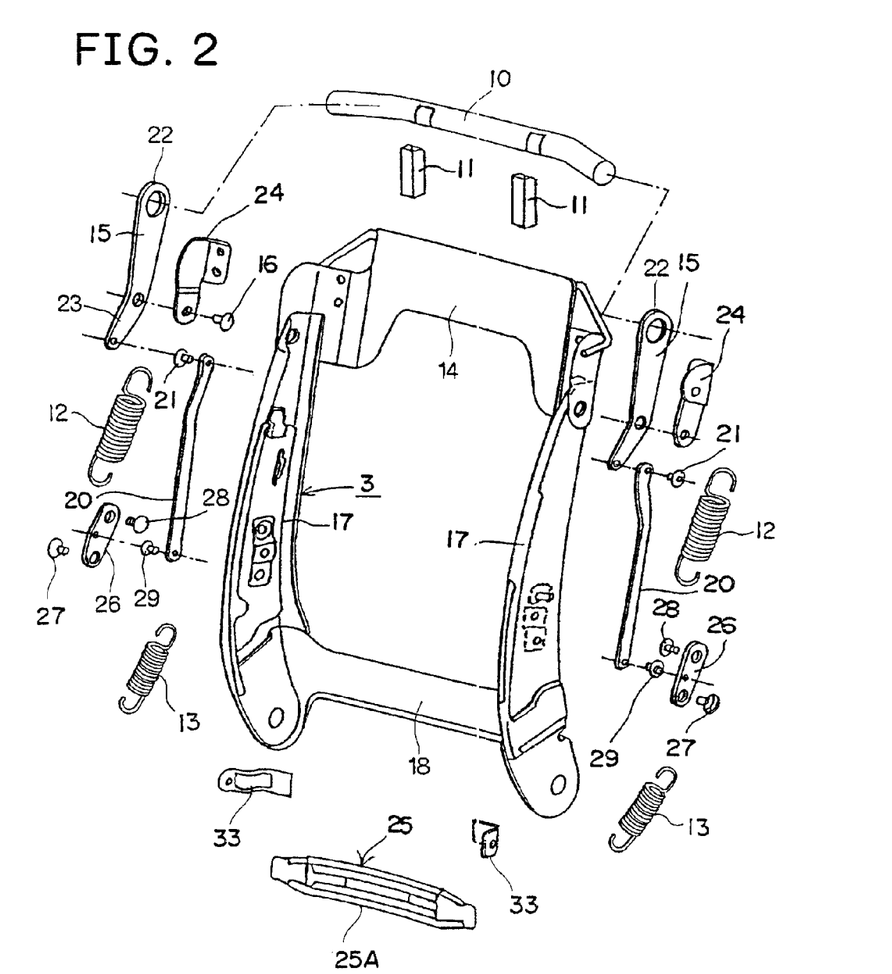
FIG. 2 is a perspective exploded view of a seatback frame of the vehicle seat.
Figure 3:
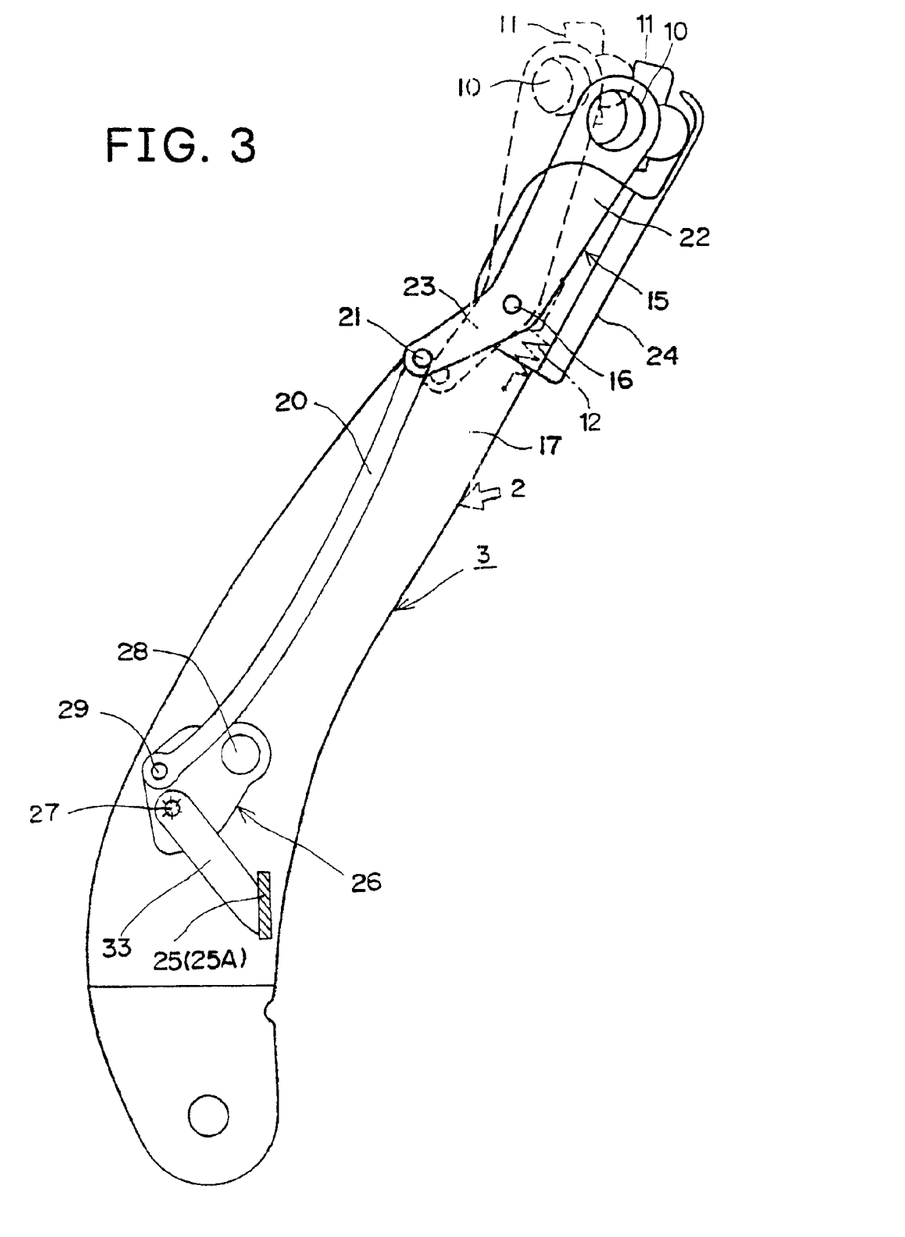
FIG. 3 is a side view of the seatback frame.
Figure 4:
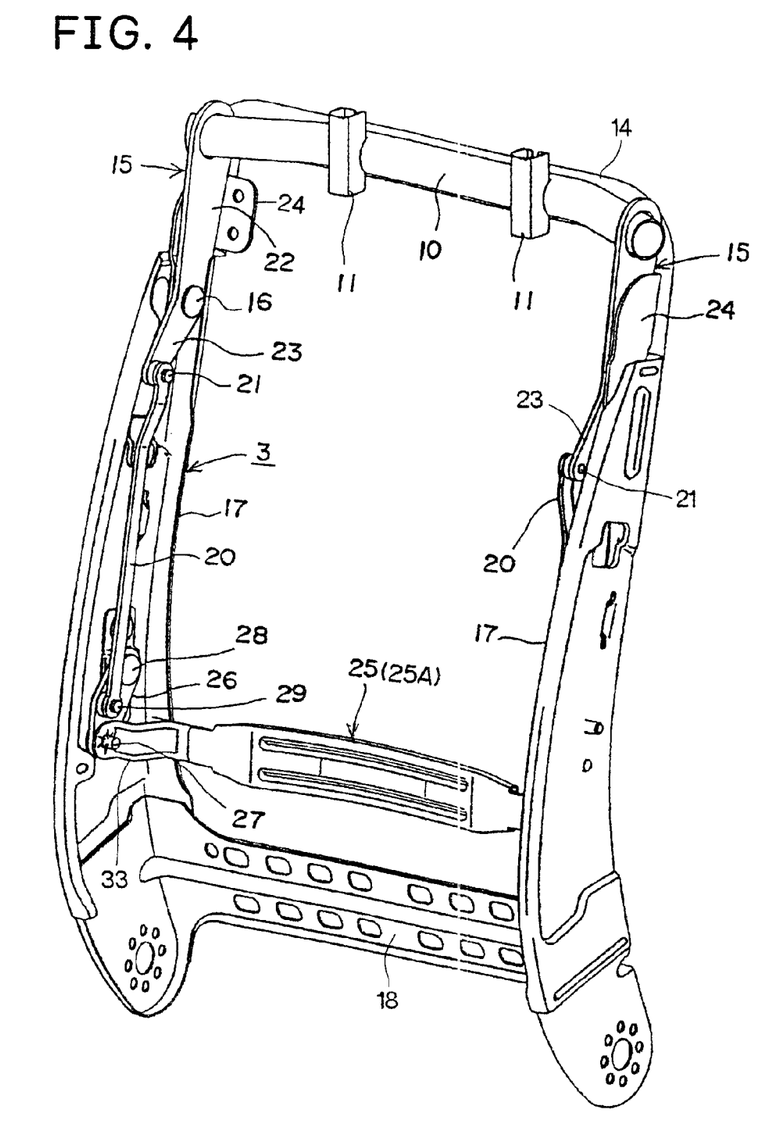
FIG. 4 is a perspective view of the seatback frame.

When the rear collision detector 25 is moved backward by backward movement of the seat occupant, the lower lever 26 rotates counterclockwise in FIG. 3 by resisting the elastic force of the lower spring 13, the connection rod 20 moves downward, the upper lever 15 rotates counterclockwise by resisting the elastic force of the upper spring 12, and the movable member 10 substantially moves forward, and thereby the headrest 6 moves forward. By the forward movement of the headrest 6, the head of the seat occupant is protected safely.

In this configuration, the upper part of the lower lever 26 is attached to the side frame 17 by the lever shaft 28, the rear collision detector 25 is fixed to the lower part of the lower lever 26 by means of the connection shaft 27, and the lower part of the connection rod 20 is disposed between the lever shaft 28 and the connection shaft 27 by means of the pin 29. Therefore, the lower lever 26 can move the rear collision detector 25 backward by the principle of leverage, using the connection shaft 27 as point of force, the lever shaft 38 as fulcrum, and the pin 29 as point of action.

In the invention, when the rear collision detector 25 moves backward, the relative angle of the rear collision detector 25 and the lower lever 26 is not changed. In the embodiment shown in FIG. 5, the rear collision detector 25 and the lower lever 26 are fixed together to the connection shaft 27, and the both rotate integrally about the lever shaft 28. By this configuration, the backward movement of the rear collision detector 25 is efficiently converted into rotary movement of the lower lever 26, and the headrest 6 can be moved forward efficiently. In addition, since the conversion efficiency of motion energy is excellent, occurrence of undesired noise is suppressed.

Figure 5:
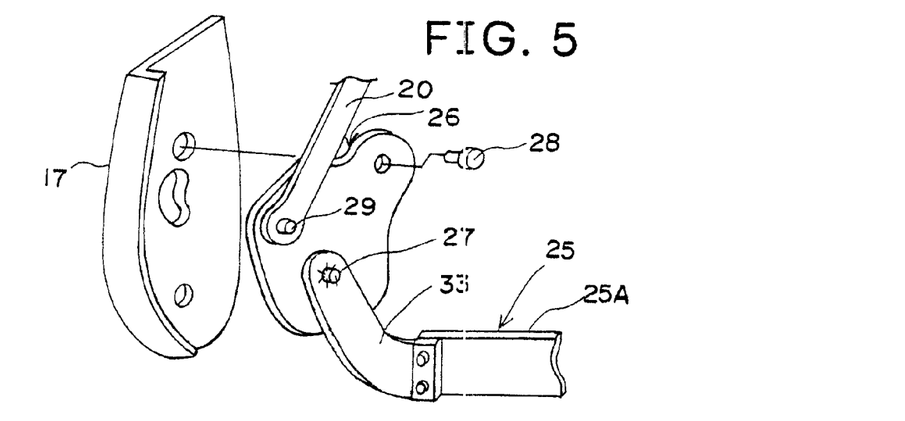
FIG. 5 is a perspective view of a connection part of a lower lever and a rear collision detector

Assuming that the rear collision detector 25 is rotatably supported on the connection shaft 27, when the rear collision detector 25 moves backward, the connection shaft 27 and the lever shaft 28 are rotatable on two centers. In other words, by backward movement of the rear collision detector 25, the rate of capability of rotation of the lower lever 26 is lowered, and the efficiency of converting backward movement of the rear collision detector 25 into the rotary motion of the lower lever 26 is lowered.

Figure 6:
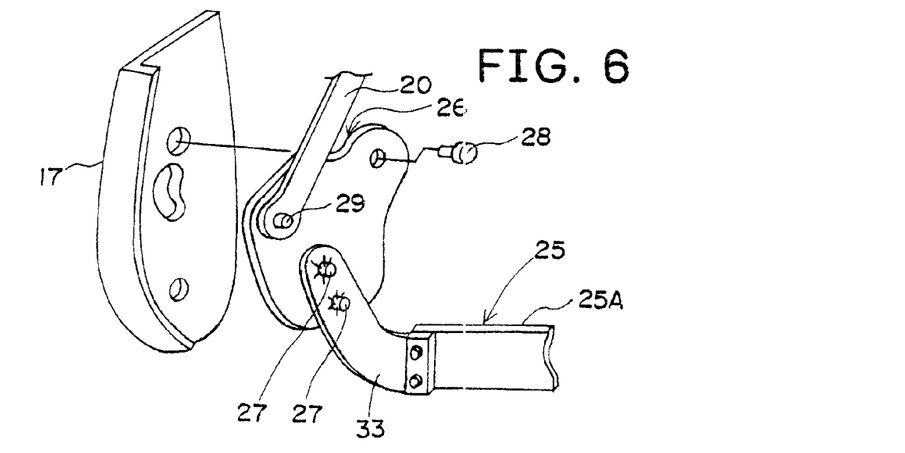
FIG. 6 is a perspective view of another embodiment of the connection part of the lower lever and the rear collision detector.
Figure 7:
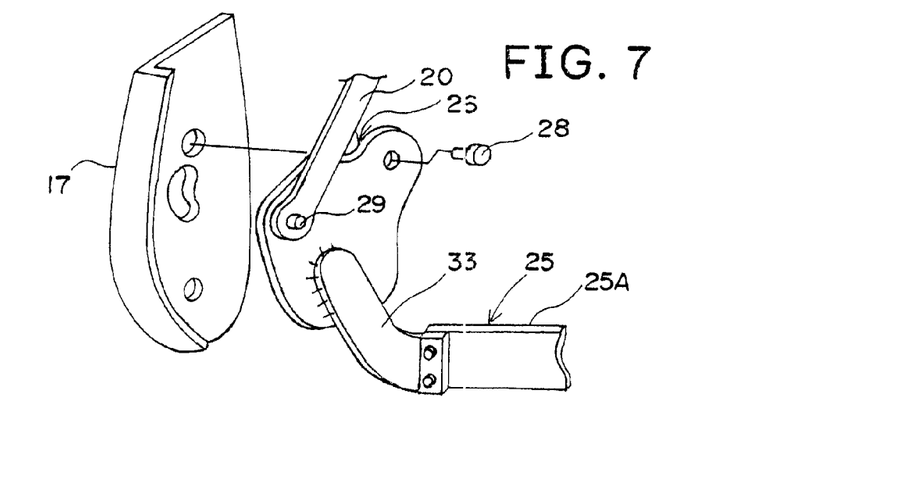
FIG. 7 is a perspective view of another embodiment of the connection part of the lower lever and the rear collision detector.

In the embodiment shown in FIG. 6, by the plurality of connection shafts 27, the connection arm 33 and the lower lever 26 are fixed and connected. When the connection arm 33 and the lower lever 26 are fixed and connected by the plurality of connection shafts 27, the structure is simple. In the embodiment shown in FIG. 7, without using the connection shaft 27, the connection arm 33 and the lower lever 26 are fixed directly by welding or the like. Hence, the number of parts can be reduced. In the embodiment in FIGS. 8 and 9, the lower lever 26 is provided with at least two stoppers 34 for holding the connection arm 33 at a specified angle. The stopper 34A regulates the movement of the rear collision detector 25 in the clockwise direction, and the stopper 34B regulates the movement of the rear collision detector 25 in the counterclockwise direction.

Figures 8, 9, 10:
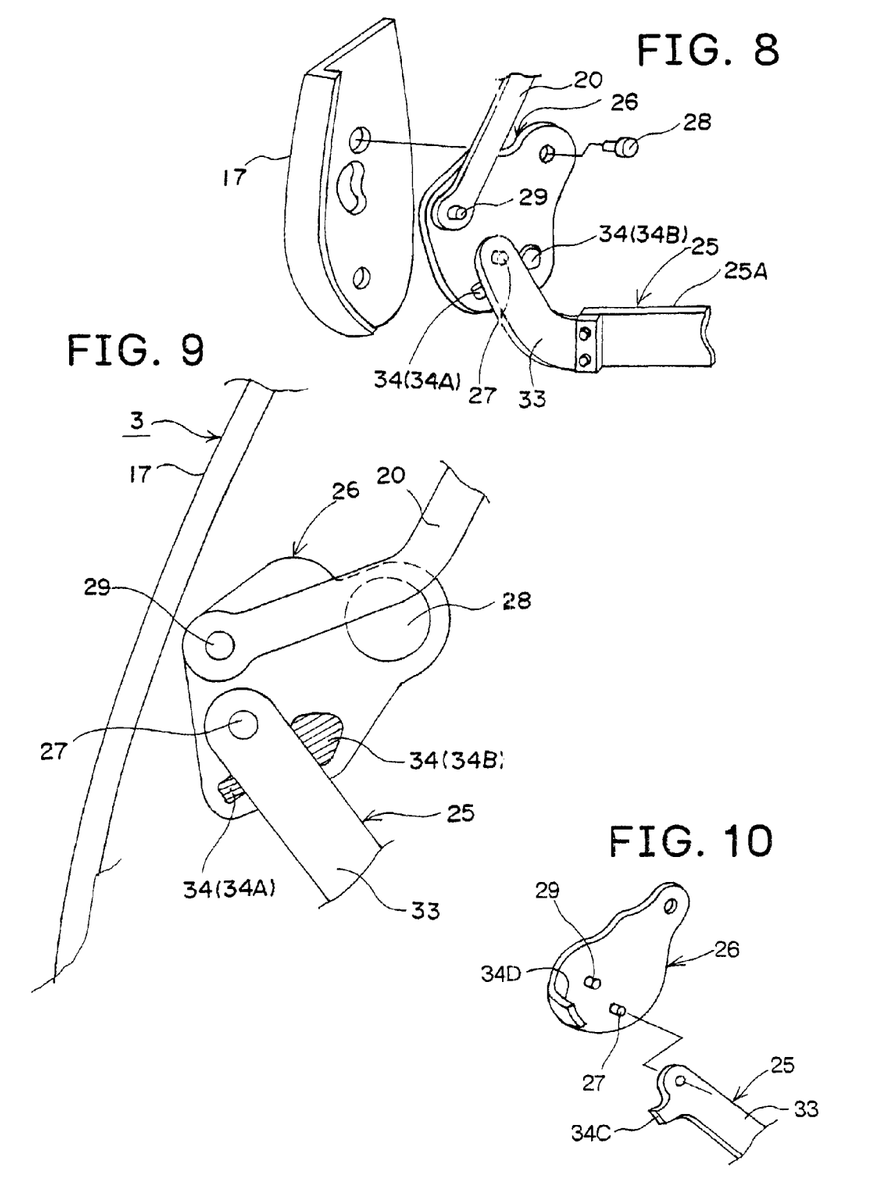
FIG. 8 is a perspective view of still another embodiment of the connection part of the lower lever and the rear collision detector.
FIG. 9 is a side view of FIG. 8.
FIG. 10 is a perspective view of yet another embodiment of the connection part of the lower lever and the rear collision detector.

In the embodiment shown in FIG. 10, by the engagement between a stopper 34C formed in the rear collision detector 25 and a stopper 34D formed in the lower lever 26, the movement of the rear collision detector 25 in the clockwise direction about the connection shaft 27 is regulated. In this configuration, when the rear collision detector 25 moves backward, the stopper 34C and the stopper 34D are engaged with each other, and the rear collision detector 25 and the lower lever 26 substantially rotate uniformly about the lever shaft 28.

The lower lever 26 is extended downward to the front side from the lever shaft 28, and its angle is about 45 degrees. The leading ends of the pin 29 and the connection arm 33 are both positioned downward to the front side from the lever shaft 28. Accordingly, the lower lever 26 for converting the backward movement of the rear collision detector 25 to the upward movement of the connection rod 20 is required only to rotate about the lever shaft 28, and thus the working space of the rear collision detector 25, the lower lever 26, and the connection rod 20 may be saved, and interference of these parts with the cushion member 4, the side frame 17 and other members can be prevented.

Moreover, the lower lever 26 is usually inclined so as to be positioned at the front side in the downward direction, and thus in the event of collision from backward, the lower lever 26 rotates backward about the lever shaft 28.

The lower lever 26 and the upper lever 15 are disposed parallel to the side frames 17, and the rear collision detector 25 is disposed between the right and left side frames 17, 17. Therefore, the design restriction on the cushion member 4 of the seatback 2 is small, and a comfortable sitting feeling is assured.

Figure 11:
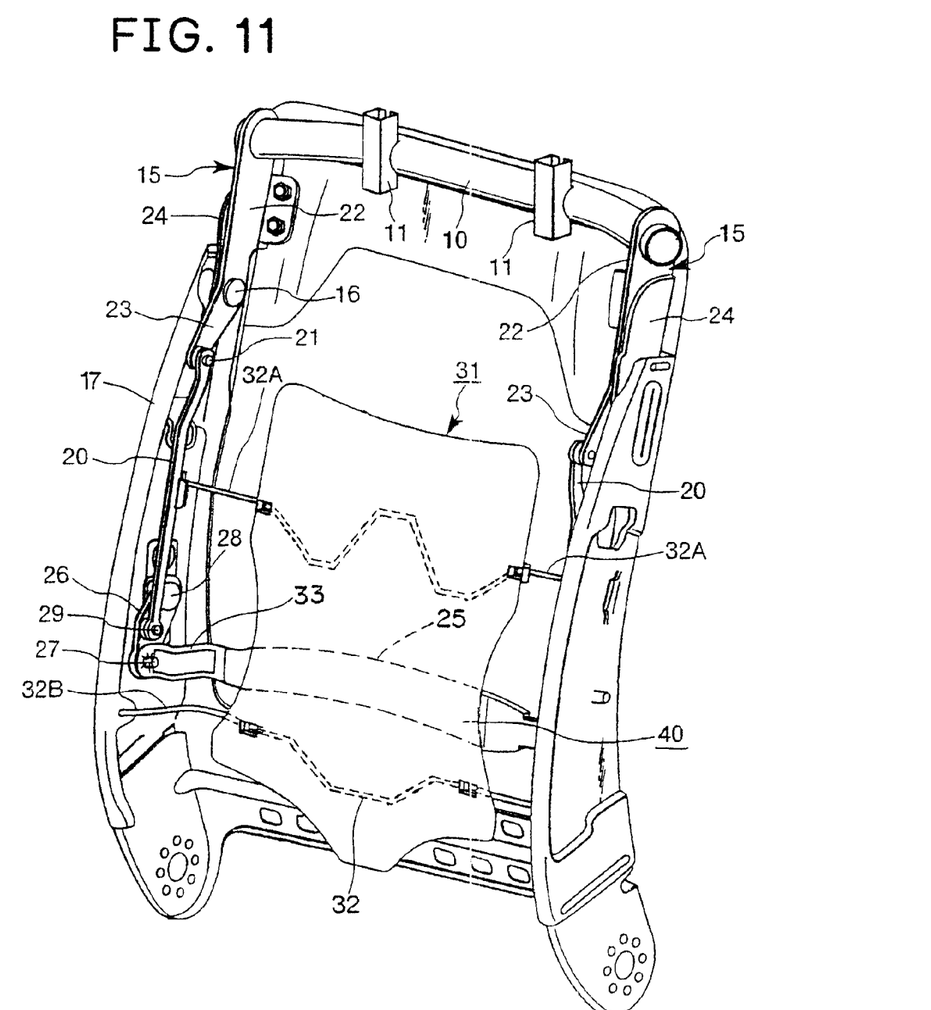
FIG. 11 is a perspective view of the seatback frame.

As shown in FIG. 11, a flexible cushion plate 31 is disposed inside the seatback frame 3. The plate 31 is preferably formed of synthetic resin such as polypropylene, and is formed in a single plate of substantially square shape. The plate 31 is mounted on a seat spring 32 such as zigzag spring or formed wire spring. The seat spring 32 has at least upper and lower seat springs 32A, 32B substantially extended laterally. The both ends of the seat springs 32 are connected to the side frames 17, 17. The cushion member 4 of the seatback 2 is positioned at the front side of the cushion plate 31, and is elastically supported by the cushion plate 31.

The conventional seatback cushion was supported directly by multiple seat springs without using a cushion plate. In such a conventional cushion, when a strong load is applied locally to the cushion, the seat spring is moved up and down, not backward, the cushion sinks into two adjacent springs, and a local backward movement, not comfortable for the occupant, may occur.

The cushion plate 31 solves this problem favorably. When the cushion plate 31 receives a normal load from the occupant by way of the cushion member 4, it is elastically deformed properly, and is moved backward in a specified range by resisting the elastic force of the seat spring 32. The plate 31 receives the normal load through the cushion member 4 by its entire structure. In other words, the plate 31 transmits the elastic force of the seat spring 32 to the cushion member 4 by its surface of wide area. Hence, as compared with the conventional structure of supporting the cushion member 4 by the seat spring 32 only, a comfortable sitting feeling is assured for the occupant.

The rear collision detector 25 is disposed behind substantially the middle of the vertical direction of the cushion plate 31, and when the cushion plate 31 is moved backward due to the backward movement of the occupant, the rear collision detector 25 is pushed by the cushion plate 31 and is moved backward. Thus, the rear collision detector 25 detects the backward movement of the cushion plate 31, and even if the backward pressure of the occupant acts locally on the cushion plate 31, the rear collision detector 25 can stably detect the backward movement of the occupant. In the event of rear collision, statistically, substantially the middle position of the vertical direction of the cushion plate 31 is moved backward most significantly. Therefore, the rear collision detector 25 is preferably disposed behind substantially the middle of the vertical direction of the plate 31. Since the longitudinal width of the seatback 2 becomes narrower as going upward, it is not preferred to dispose the rear collision detector 25 behind the upper side of the cushion plate 31.

Thus, when the cushion plate 31 is disposed between the rear collision detector 25 and the cushion member 4, improvement of comfort of sitting and improvement of detecting performance of rear collision may be expected.

Figure 12:
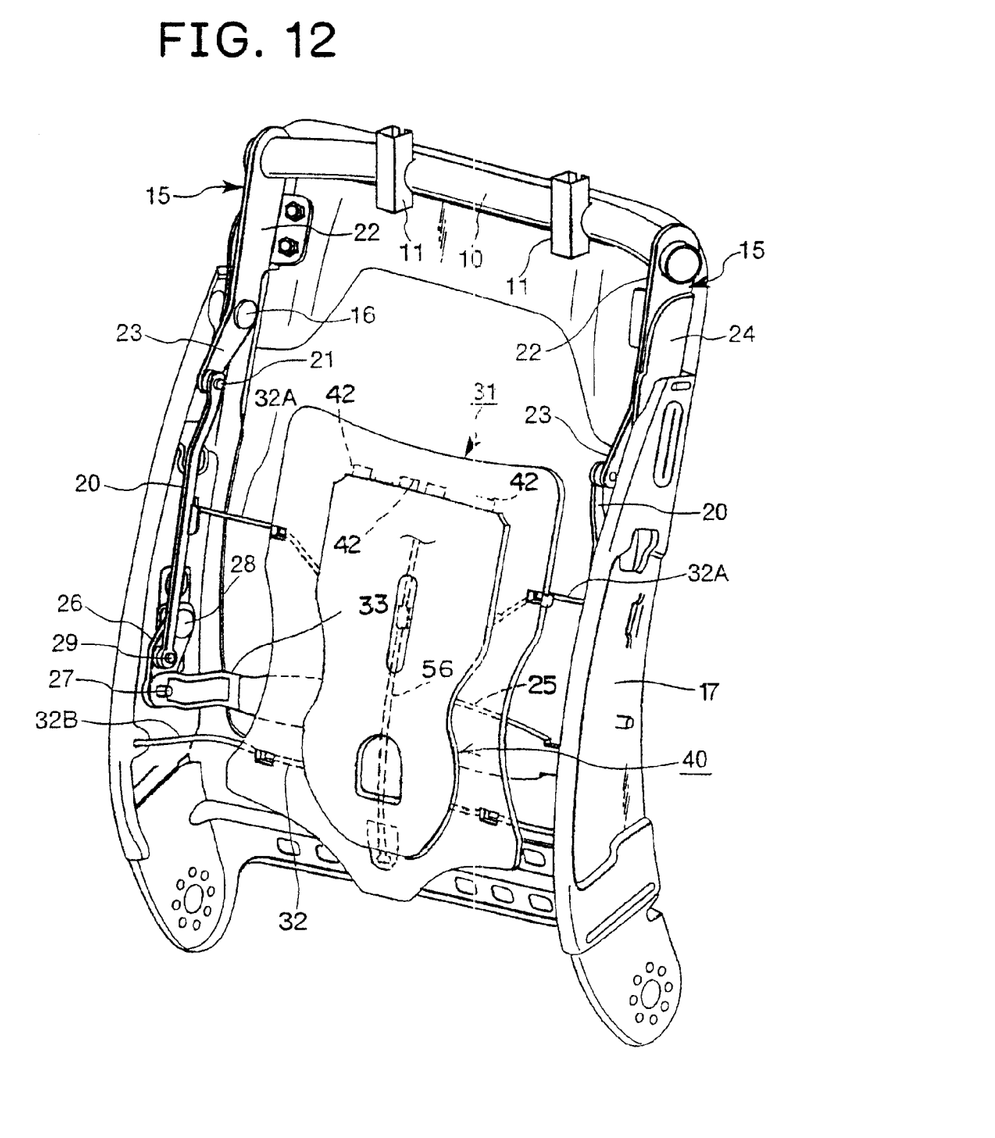
FIG. 12 is a perspective exploded view of an embodiment having a flexible auxiliary plate.

Between the cushion plate 31 and the cushion member 4, a flexible auxiliary plate 40 is disposed (FIG. 12). The auxiliary plate 40 is preferably formed of synthetic resin such as polypropylene, and is formed in a single square plate smaller than the cushion plate 31. The auxiliary plate 40 is curved so as to project forward by manipulation of the occupant, push the cushion member 4 forward, and adjust the cushion pressure on the occupant.

Figure 13:
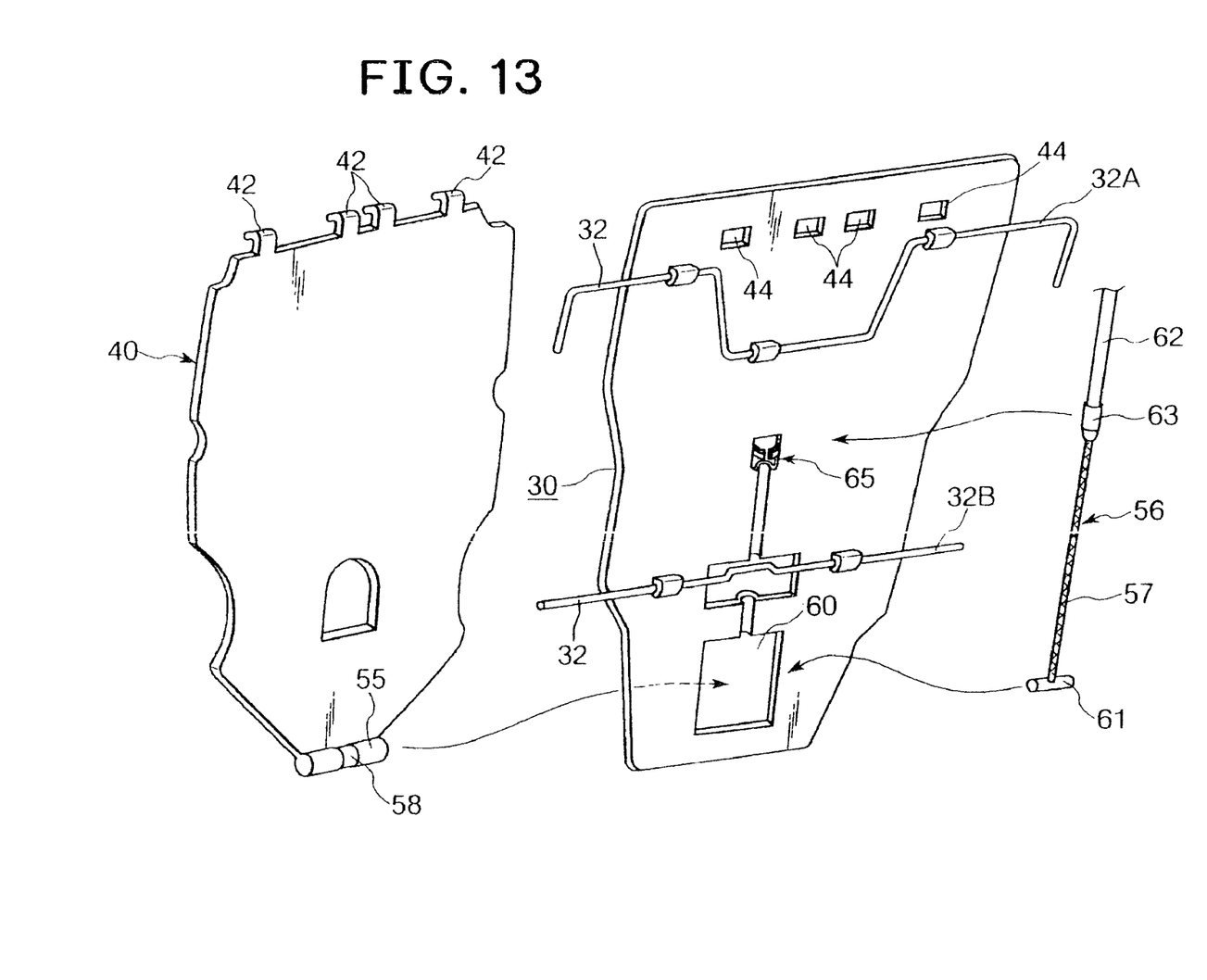
FIG. 13 is a perspective exploded view of the flexible auxiliary plate and the cushion plate.

As shown in FIG. 13, a plurality of hooks 42 are provided in the upper part of the auxiliary plate 40, and the hooks 42 are engaged with engaging holes 44 formed in the cushion plate 31. In the middle position of the flexible cushion plate 31, a tube locking part 65 is provided for locking a tube end 63 of an outer tube 62 of a wire cable 56. In the lower part of the auxiliary plate 40, a lower protrusion 55 protruding slightly to the rear side is provided, and an engaging groove 58 is formed in the lower protrusion 55. The lower protrusion 55 protrudes backward of the cushion plate 31 from a lower opening 60 formed in the lower part of the cushion plate 31, and the engaging groove 58 of the lower protrusion 55 is engaged with a cable head 61 of an inner cable 57 of the wire cable 56.

When the inner cable 57 of the wire cable 56 is pulled, the cable head 61 of the inner cable 57 moves the lower protrusion 55 of the auxiliary plate 40 upward, and the auxiliary plate 40 is curved so as to project forward, push the cushion member 4 forward, and adjust the cushion pressure on the occupant. The lower protrusion 55 and the lower opening 60 have nearly the same lateral width, and when the lower protrusion 55 moves vertically, the both sides of the lower protrusion 55 are guided by the inner wall of the lower opening 60.

When the distance is shortened between the upper edge and the lower edge of the flexible auxiliary plate 40, the vertical middle portion of the auxiliary plate 40 projects largely to the front side, and the forward pushing force on the occupant is reinforced, or, to the contrary, when the interval is extended between the upper edge and the lower edge of the flexible auxiliary plate 40, the forward projecting amount of the flexible auxiliary plate 40 can be moderately adjusted.

Figure 14:
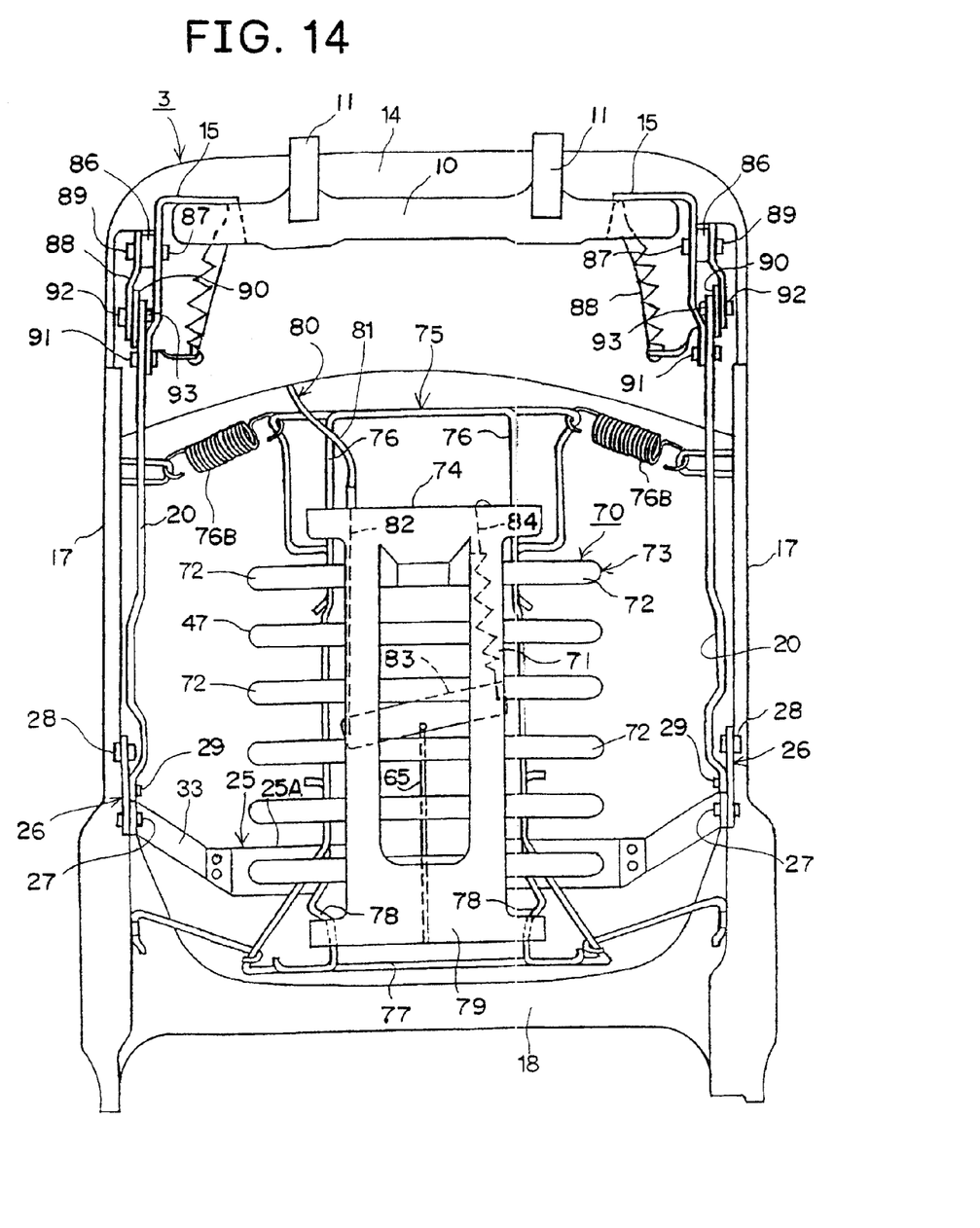
FIG. 14 is a front view of an embodiment having cushion support means.
Figure 15:
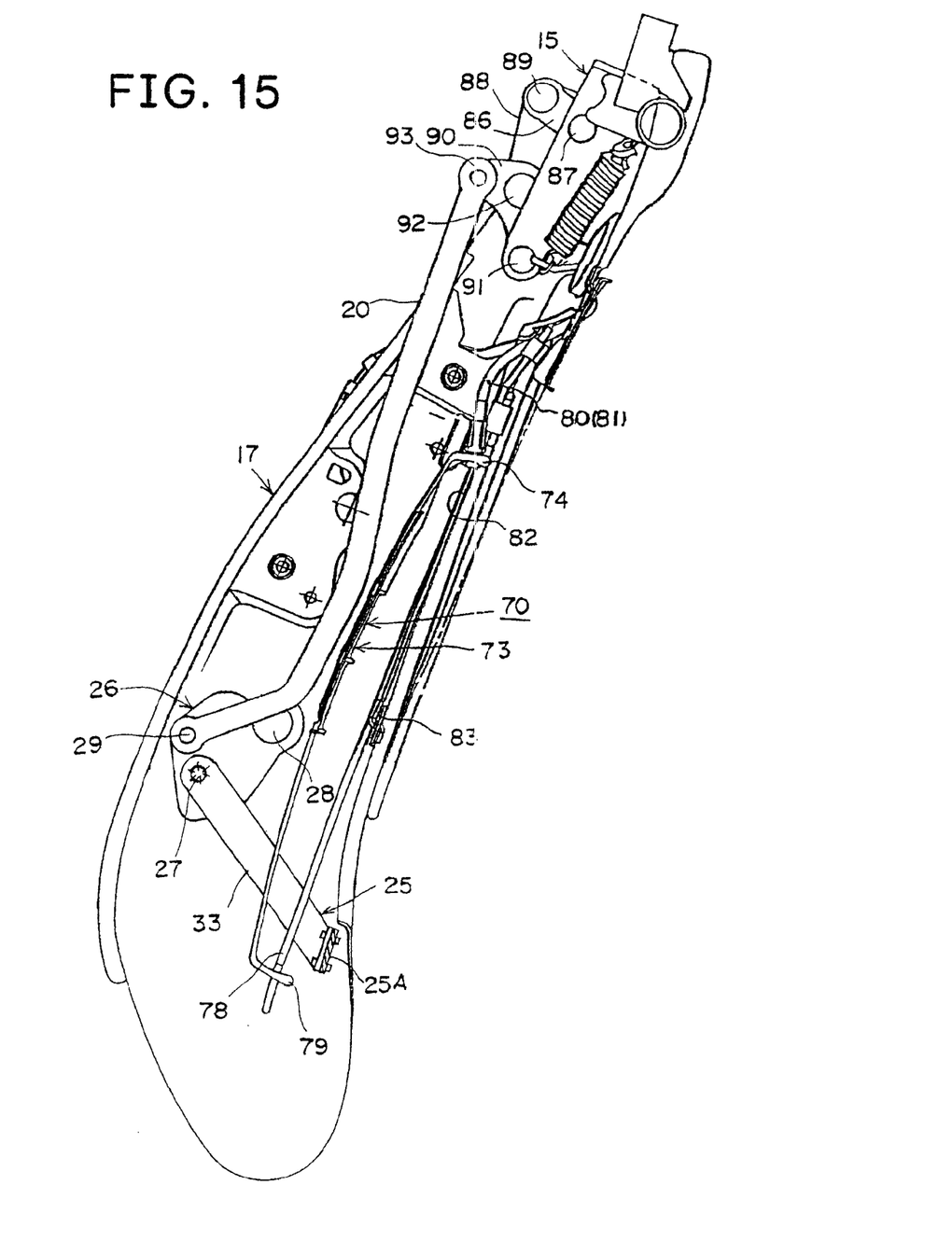
FIG. 15 is a side view of FIG. 14.
Figure 16:
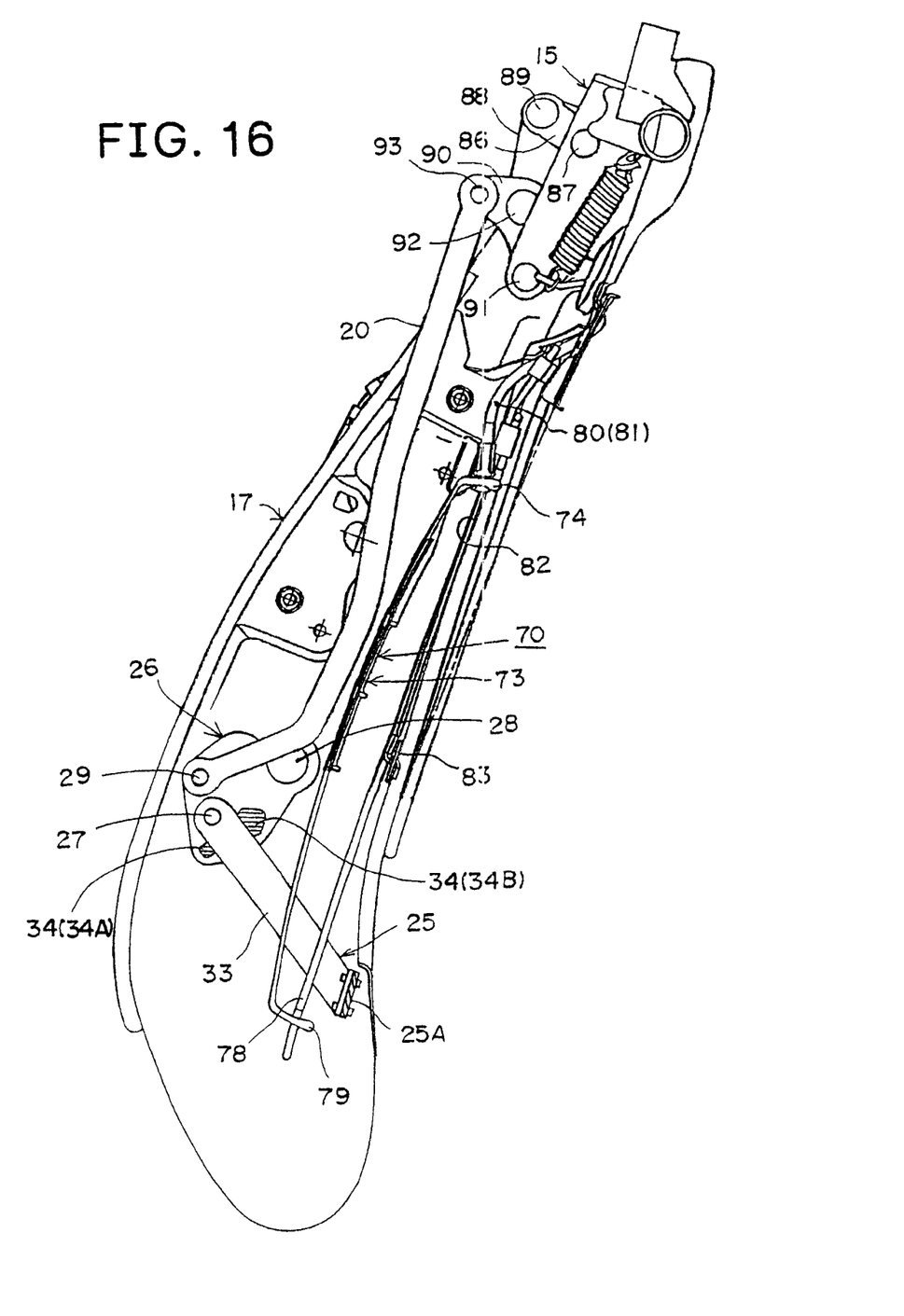
FIG. 16 is a side view of an embodiment having a cushion support mechanism.

FIGS. 14 to 16 show an embodiment having cushion support means 70, instead of the flexible cushion plate 31 shown in FIG. 11. The support means 70 is disposed in the inside space of the seatback frame 3 like the cushion plate 31.

The cushion support means 70 has a flexible frame 73. The flexible frame 73 has a pair of flexible vertical frames 71, and a plurality of flexible lateral frames 72 supported on the vertical frames 71. The flexible frame 73 elastically supports the cushion member 4. The upper parts of the pair of vertical frames 71 are coupled by an upper lateral connection frame 74, and the lower parts of the pair of vertical frames 71 are coupled by a lower lateral connection frame 79.

The cushion support means 70 has a guide frame 75 formed of a metal rod or the like. The guide frame 75 is positioned behind the flexible frame 73. The guide frame 75 has a pair of vertical rods 76, and the upper lateral connection frame 74 of the flexible frame 73 is supported on the vertical rods 76 movably in the vertical direction. The upper right and left sides of the guide frame 75 are mounted on the right and left side frames 17, 17 by way of coil springs 76B, 76B.

The lower parts of the vertical rods 76 are connected by a lower lateral connection rod 77. In the lower part of the vertical rods 76, a flex part 78 is formed. The flex part 78 abuts against a lower lateral connection frame 79 of the flexible frame 73, and regulates the upward movement of the lower lateral connection frame 79.

At either right or left side of the upper lateral connection frame 74 of the flexible frame 733, the end part of an outer tube 81 of a wire cable 80 is connected, and the leading end of an inner cable 82 of the wire cable 80 is connected to one end of an arm 83. At the other end of the arm 83, the lower end of a spring 84 is locked, and the upper end of the spring 84 is locked on the upper lateral connection frame 74.

When the inner cable 82 of the wire cable 80 is pulled, the interval between the upper lateral connection frame 74 and the lower lateral connection frame 79 of the flexible frame 73 is narrowed, and the flexible frame 73 is curved to project forward, push the cushion member 4 forward, and adjust the cushion pressure on the occupant. To the contrary, when the inner cable 82 of the wire cable 80 is loosened, by the elastic force of the spring 84 and the elasticity of the flexible frame 73, the interval between the upper lateral connection frame 74 and the lower lateral connection frame 79 of the flexible frame 73 is widened, and the pressure on the cushion member 4 is weakened.

When the middle plate 25A of the rear collision detector 25 is positioned slightly above the lower lateral connection frame 79, rear collision can be detected securely while enhancing the holding performance by the flexible frame 73, which is preferable.

Preferably, the rear collision detector 25 is positioned across a specified gap behind the guide frame 75 when no occupant is seated on the seat 1 (while backward pressure is not acting on the cushion member 4), and when the occupant is seated on the seat 1, the flexible frame 73 and the guide fame 75 are moved backward, so that the guide frame 75 may precisely abut against the rear collision detector 25.

In FIGS. 14 to 16, the upper lever 15 is fixed to both right and left ends of the movable member 10. On a bracket 88 fixed to the seatback frame 3, an upper arm 86 is pivoted by a shaft 89, and a lower arm 90 is similarly pivoted on the bracket 88 by a shaft 92. The upper part of the connection rod 20 is connected to the lower arm 90 by a shaft 93. The lower part of the upper lever 15 is connected to the lower arm 90 by a shaft 91. The middle part of the upper lever 15 is connected to the upper arm 86 by a shaft 87.

In the invention, as described above, the rear collision detector 25 rotates together with the lower lever 26, and the positional relation of the mounting portion between the lower lever 26 and the rear collision detector 25 is not changed. Therefore, generation of unusual sound can be prevented, and the rear collision energy applied to the rear collision detector 25 can be efficiently transmitted to the headrest 6.

The rear collision detector 25 can be easily fixed to the lower lever 26. Also, the rear collision detector 25 can be easily and securely fixed to the lower lever 26.

Mounting of the rear collision detector 25 on the seatback frame 3 is facilitated, and the rear collision energy transmission efficiency can be enhanced by the stopper 34.

Rotation of the rear collision detector 25 around the axis of the connection shaft 27 of the connection arm 33 is fixed by the stopper 34A, and thus mounting is easy. Further, the movement of the rear collision detector 25 obliquely, backward and upward can be stopped by the stopper 34B, and thus the rear collision energy transmission efficiency can be enhanced.

The flexible cushion plate 31 can provide the seatback 2 having both excellent cushion property, and a positive support of the head of the occupant (active headrest) by the rear collision detector 25 in the event of rear collision.

In spite of the seatback 2 having excellent cushion property and active headrest mechanism, the supporting elastic force of the occupant can be further adjusted, and the seating feeling can be further enhanced.

The cushion support means 70 realizes both excellent cushion performance and adjustment of supporting elastic force of the seat occupant, and the rear collision detector 25 does not rotate backward (upward). Therefore, interference between the rear collision detector 25 and the cushion support means 70 can be avoided to prevent generation of unusual noise, and transmission efficiency of rear collision energy can be enhanced.

The invention claimed is:

1. A vehicle seat wherein a seatback frame of a seatback is formed in a hollow square frame shape, a head rest is attached to the seatback frame so as to be movable longitudinally by right and left upper levers, the right and left upper levers are connected to right and left lower lever levers provided in the seatback frame by a connection rod, right and left connection arms of a rear collision detector are attached to the right and left lower levers, respectively, the rear collision detector actuates the right and left upper levers by way of the right and left lower levers and the connection rod when a seat occupant is moved backward by inertia, and thereby moves the headrest forward to protect the head of the occupant, and the right and left connection arms of the rear collision detector are attached to the right and left lower levers, respectively, in a fixed state for maintaining a specified angle,     wherein the right and left lower levers are each provided with a first stopper for holding the connection arms at a specified angle, and     wherein the right and left connection arms are attached by the connection shaft so as to be positioned nearly in parallel to the sides of the right and left lower levers, and the right and left lower levers beneath a lower side edge of the right and left connection arms comprises a second stopper composing a part of the first stopper, and the right and left lower levers above an upper side edge of the right and left connection arms comprises a third stopper composing a part of the first stopper.

2. The vehicle seat according to claim 1, wherein the right and left connection arms are attached to the right and left lower levers by means of a connection shaft, and the connection shaft fixes both the right and left connection arms and the right and left lower levers.

3. The vehicle seat according to claim 1, wherein the right and left connection arms are attached to the right and left lower levers in a fixed state by means of a plurality of connection shafts.

4. The vehicle seat according to any one of claims 1 to 3, further comprising a flexible cushion plate disposed inside the hollow square frame of the seatback frame, the flexible cushion plate comprising a single plate capable of supporting the back of the seat occupant separately from the rear collision detector and being mounted on a seat spring 32 so as to be movable back and forth to the seatback frame by way of the seat spring, wherein the rear collision detector is disposed behind a rear side of the flexible cushion plate, and the right and left levers are connected at respective right and left sides of the flexible cushion plate.

5. The vehicle seat according to claim 4, further comprising a flexible auxiliary plate disposed on a front side of the flexible cushion plate opposite the rear side of the flexible cushion plate, the flexible auxiliary plate comprising a single plate having elasticity so as to be movable longitudinally to the flexible cushion plate, and the flexible auxiliary plate is variable to be narrow and wide in the interval between the upper side and lower side thereof so as to be movable back and forth, so that supporting elastic force for supporting the body of the occupant may be adjusted.

6. The vehicle seat according to any one of claims 1 to 3, further comprising a cushion support device disposed in the hollow square frame of the seatback frame at the front side of the rear collision detector, the cushion support means comprising a flexible frame, the flexible frame comprising a pair of right and left flexible vertical frames and a plurality of flexible lateral frames projecting to the side of the pair of right and left flexible vertical frames in parallel at a specific interval in vertical direction, wherein the flexible frame is formed of a synthetic resin so as to be deformed elastically, and expanding and contracting vertically so as to be adjustable in the degree of pressing the cushion member forward.

\* \* \* \* \*